(12) United States Patent
Butt et al.

(10) Patent No.: US 9,244,628 B2
(45) Date of Patent: Jan. 26, 2016

(54) REDUCING ELAPSED TIME TO ACCESS DATA FROM A STORAGE MEDIUM DURING A RECALL OPERATION

(71) Applicant: GLOBALFOUNDRIES U.S. 2 LLC, Hopewell Junction, NY (US)

(72) Inventors: Kevin D. Butt, Tucson, AZ (US); Paul M. Greco, Tucson, AZ (US); James M. Karp, Tucson, AZ (US); Takashi Katagiri, Yokohama (JP)

(73) Assignee: GLOBALFOUNDRES Inc., Grand Cayman (KY)

( * ) Notice: Subject to any disclaimer, the term of this patent is extended or adjusted under 35 U.S.C. 154(b) by 167 days.

(21) Appl. No.: 14/056,811

(22) Filed: Oct. 17, 2013

(65) Prior Publication Data

US 2015/0113216 A1    Apr. 23, 2015

(51) Int. Cl.
*G06F 3/06*    (2006.01)
(52) U.S. Cl.
CPC ............ *G06F 3/0656* (2013.01); *G06F 3/0611* (2013.01); *G06F 3/0685* (2013.01)
(58) Field of Classification Search
CPC ..... G06F 3/061; G06F 3/0659; G06F 3/0682; G06F 3/0686
See application file for complete search history.

(56) References Cited

U.S. PATENT DOCUMENTS

| 8,234,443 | B2 | 7/2012 | Katagiri |
| 2007/0271410 | A1 | 11/2007 | Shackelford |
| 2009/0327631 | A1 | 12/2009 | Yamada et al. |
| 2010/0057990 | A1 | 3/2010 | Mizuno et al. |
| 2012/0054428 | A1 | 3/2012 | Butt et al. |
| 2013/0246701 | A1 | 9/2013 | Fujihara et al. |

FOREIGN PATENT DOCUMENTS

WO    2012/025492 A1    3/2012

OTHER PUBLICATIONS

Zhang, Xianbo, HPTFS: A High performance Tape File System, Proceedings of 14th NASA Goddard/23rd IEEE conference on Mass Storage System and Technologies, 2006.*
International Search Report and Written Opinion from PCT Application No. PCT/CN2014/087502, dated Dec. 31, 2014.
"Self adaptive buffered read," IBM, Sep. 21, 2005, IPCOM000128926D, pp. 1-3.

* cited by examiner

*Primary Examiner* — Ryan Bertram

(57) ABSTRACT

In one embodiment, a tape drive includes a drive buffer, a processor, and logic integrated with and/or executable by the processor, the logic being configured to cause the processor to: receive a list including: user data segments recorded on tape media, wherein the user data segments are arranged in the list according to a predetermined order, and information associated with each user data segment, wherein the information includes a description of a physical location of each of the user data segments on the tape media. The logic is further configured to cause the processor to locate each of the user data segments on the tape media according to the order in the list, read each of the user data segments from the tape media according to the order in the list, and write each of the user data segments to a buffer according to the order in the list.

20 Claims, 13 Drawing Sheets

| Byte/Bit | 7 | 6 | 5 | 4 | 3 | 2 | 1 | 0 |
|---|---|---|---|---|---|---|---|---|
| 0 | OPERATION CODE (x92) | | | | | | | |
| 1 | Reserved | ReadAhead | DEST_TYPE | | | Rsvd | CP | IMMED |
| 2 | | | | | | | | BAM |
| 3 | Reserved | | | | | | | |
| 4 | Partition | | | | | | | |
| 5 | Logical Identifier | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | Logical Identifier at the end of user operations | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | Partition for next user operations | | | | | | | |
| 21 | Logical Identifier for next user operations | | | | | | | |
| 22 | | | | | | | | |
| 23 | | | | | | | | |
| 24 | | | | | | | | |
| 25 | | | | | | | | |
| 26 | | | | | | | | |
| 27 | | | | | | | | |
| 28 | | | | | | | | |
| 29 | Reserved | | | | | | | |
| 30 | Reserved | | | | | | | |
| 31 | Control | | | | | | | |

| Byte | Bit | | | | | | | |
|---|---|---|---|---|---|---|---|---|
| | 7 msb | 6 | 5 | 4 | 3 | 2 | 1 | 0 lsb |
| 0 | OPERATION CODE (A4h) | | | | | | | |
| 1 | ACCESS ORDER COMMAND (001b) | | | SERVICE ACTION (1Fh) | | | | |
| 2 | Reserved | | | | | | | |
| 5 | | | | | | | | |
| 6 | MSB | | | | | | | |
| ... | | | PARAMETER LIST LENGTH | | | | | |
| 9 | | | | | | | | LSB |
| 10 | Reserved | | | | | | | |
| 11 | Control Byte | | | | | | | |

| Byte | Bit | | | | | | | |
|---|---|---|---|---|---|---|---|---|
| | 7 msb | 6 | 5 | 4 | 3 | 2 | 1 | 0 lsb |
| 0 | Reserved | | | | | | | |
| ... | | | | | | | | |
| 3 | | | | | | | | |
| 4 | (MSB) | | | | | | | |
| ... | | | ADDITIONAL DATA (n-7) | | | | | |
| 7 | | | | | | | | (LSB) |
| | User Data Segment descriptors | | | | | | | |
| x | User Data Segment descriptor (first) | | | | | | | |
| | : | | | | | | | |
| y ... n | User Data Segment descriptor (last) | | | | | | | |

FIG. 7B

| Byte | Bit | | | | | | | |
|---|---|---|---|---|---|---|---|---|
| | 7 msb | 6 | 5 | 4 | 3 | 2 | 1 | 0 lsb |
| 0 | (MSB) | | | DESCRIPTOR LENGTH (Eh) | | | | (LSB) |
| 1 | | | | | | | | |
| 2 | | | | Reserved | | | | |
| 3 | | | | Reserved | | | | |
| 4 | | | | Reserved | | | | |
| 5 ⋮ 14 | | | | UDS NAME | | | | |
| 15 | | | | | | | | |
| 16 | (MSB) | | | PARTITION NUMBER | | | | |
| ⋮ 23 | | | | | | | | (LSB) |
| 24 | (MSB) | | | BEGINNING LOGICAL OBJECT IDENTIFIER | | | | |
| ⋮ 31 | | | | ENDING LOGICAL OBJECT IDENTIFIER | | | | (LSB) |

REDUCING ELAPSED TIME TO ACCESS DATA FROM A STORAGE MEDIUM DURING A RECALL OPERATION

BACKGROUND

The present invention relates to data storage systems, and more specifically, this invention relates to recall operations in hierarchical storage management (HSM) systems.

An ever increasing amount of computer readable storage space is needed to keep pace with expanding data storage demands. Increasing data storage capacity requires improved storage management systems to backup and protect data sets, and migrate less active data sets to secondary storage to increase primary storage space. A data set may be composed of any collection or grouping of data. In certain systems, a data set may include control information used by the system to manage the data. The terms data set and file are generally equivalent and sometimes are used interchangeably. Hierarchical storage management (HSM) programs manage storage devices, such as tape libraries, to control the flow of data between primary and secondary storage facilities.

In a hierarchical storage management system, data is stored in different types of storage devices depending upon the frequency of usage of the data. For instance, a system may include multiple storage media types to store data having different usage patterns and likelihoods of access. More frequently used data may be stored on direct access storage devices (DASD) comprising high-performance rapid access storage devices, such as hard disk drives. Less frequently used data may be archived on slower and less expensive, demountable storage media, such as optical disks, magnetic tape cartridges, etc.

Two common functions initiated by host systems in hierarchical storage management systems include migration and recall. Migration typically involves the movement of data from a rapid access storage device to a slower access storage device, e.g. a tape cartridge. Conversely, a recall operation generally involves data transfer in the opposite direction. For example, when a migrated data set stored on a tape volume is requested by an application in a recall operation, the respective tape volume is mounted, the tape drive moves to the location of the data records associated with the data set, and the requested data records are read.

With regard to recall operations in HSM systems, the time taken to recall a file from the mount point of the respective tape volume is important. The time to locate a requested data record may be influenced by the length of the tape medium, the reposition velocity, the physical position of the requested data sets on the tape media, etc. Additionally, a tape drive may not know, with certainty, the actual physical position of the target data files on the tape medium, which may lead to longer than desired elapsed times.

Moreover, the time that elapses to recall a file from a lower storage tier to a higher storage tier in an HSM system may be influenced and/or longer than desired due to the difference in data rates associated with a host reading data from a tape drive versus a tape drive reading data from a tape medium. For instance, the data rate for a tape drive to read data from a tape medium is generally much faster than the data rate for a host to read data from the tape drive. As an illustration only, consider the case where the total bandwidth of a higher storage tier (e.g. comprising hard disk storage) is 2500 MB/sec, and an application running on a host system uses 2000 MB/sec. The total bandwidth for a recall operation is 2500 MB/sec−2000 MB/sec=500 MB/sec. If there are 10 tape drives, the data rate between the higher storage tier (the hard disk drives) and each tape drive is only 500 MB/sec/10=50 MB/sec, which may be significantly slower than a tape drive having a data rate of, for example, 250 MB/sec.

Accordingly, it would be beneficial to have a system, method and/or computer program product which could reduce the inefficiencies in accessing data during a recall operation in systems which employ hierarchical storage.

BRIEF SUMMARY

According to one embodiment, a method includes receiving a list including: a plurality of user data segments recorded on tape media, wherein the user data segments are arranged in the list according to a predetermined order, and information associated with each user data segment, wherein the information comprises a description of a physical location of each of the user data segments on the tape media. This method also includes locating each of the user data segments on the tape media according to the information and the order in the list, reading each of the user data segments from the tape media according to the order in the list, and writing each of the user data segments to a buffer according to the order in the list.

According to another embodiment, a method includes: determining an order in which to retrieve a plurality of user data segments recorded on tape media, generating a list including: the plurality of user data segments, wherein the plurality of user data segments are arranged in the list according to the order, and information associated with the plurality of user data segments, wherein the information comprises a description of a physical location of each of the user data segments on the tape media. This method also includes transmitting the list.

According to yet another embodiment, a tape drive includes a drive buffer, a processor, and logic integrated with and/or executable by the processor, the logic being configured to cause the processor to: receive a list including: a plurality of user data segments recorded on tape media, wherein the user data segments are arranged in the list according to a predetermined order, and information associated with each user data segment, wherein the information comprises a description of a physical location of each of the user data segments on the tape media. The logic integrated with and/or executable by the processor is further configured to cause the processor to locate each of the user data segments on the tape media according to the order in the list, read each of the user data segments from the tape media according to the order in the list, and write each of the user data segments to a buffer according to the order in the list.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 6B illustrates a representation of an Enhanced Locate Command to locate, and/or access/read user data segments recording on tape media, according to one embodiment.

FIG. 7A illustrates a diagram of a Sequence Access Order Command to locate, and/or access/read user data segments recorded on tape media, according to one embodiment.

FIG. 7B illustrates a representation of the contents of the Parameter List field of Sequence Access Order Command shown in FIG. 7A, according to one embodiment.

FIG. 7C illustrates a representation of the contents of the User Data Segment Descriptors field of the Parameter List shown in FIG. 7B, according to one embodiment.

DETAILED DESCRIPTION

Figure 1:
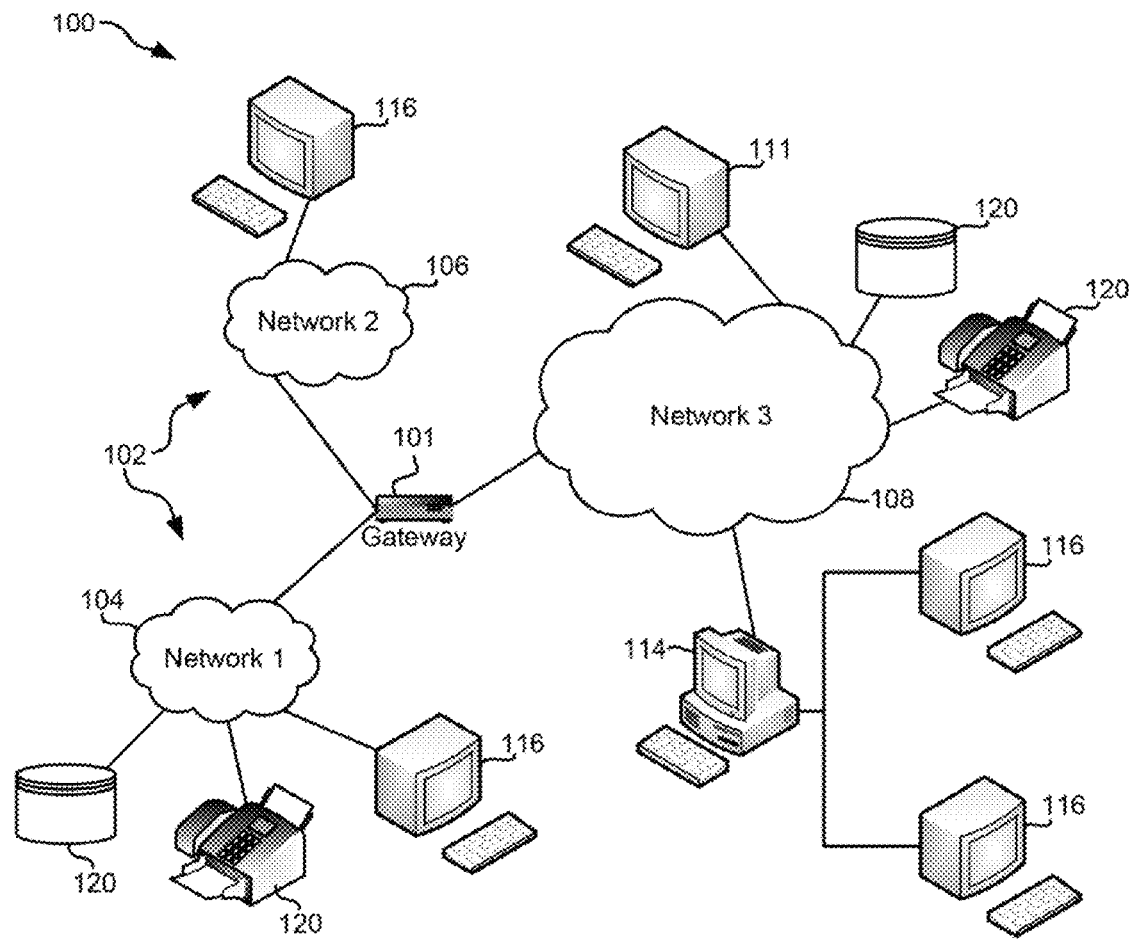
FIG. 1 illustrates a network architecture, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In various approaches described herein, a user data segment (UDS) may be defined as a grouping of continuous logical objects (e.g. data records) recorded on a tape medium.

The following description discloses several general and preferred embodiments of systems, methods and computer program products for reducing the elapsed time to access data from a storage medium during a recall operation.

According to one general embodiment, a method includes receiving a list including: a plurality of user data segments recorded on tape media, wherein the user data segments are arranged in the list according to a predetermined order, and information associated with each user data segment, wherein the information comprises a description of a physical location of each of the user data segments on the tape media. This method also includes locating each of the user data segments on the tape media according to the information and the order in the list, reading each of the user data segments from the tape media according to the order in the list, and writing each of the user data segments to a buffer according to the order in the list.

According to another general embodiment, a method includes: determining an order in which to retrieve a plurality of user data segments recorded on tape media, generating a list including: the plurality of user data segments, wherein the plurality of user data segments are arranged in the list according to the order, and information associated with the plurality of user data segments, wherein the information comprises a description of a physical location of each of the user data segments on the tape media. This method also includes transmitting the list.

According to yet another general embodiment, a tape drive includes a drive buffer, a processor, and logic integrated with and/or executable by the processor, the logic being configured to cause the processor to: receive a list including: a plurality of user data segments recorded on tape media, wherein the user data segments are arranged in the list according to a predetermined order, and information associated with each user data segment, wherein the information comprises a description of a physical location of each of the user data segments on the tape media. The logic integrated with and/or executable by the processor is further configured to cause the processor to locate each of the user data segments on the tape media according to the order in the list, read each of the user data segments from the tape media according to the order in the list, and write each of the user data segments to a buffer according to the order in the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." For example, one approach may include a processor and logic integrated with and/or executable by the processor, the logic being configured to perform various operations. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 11 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
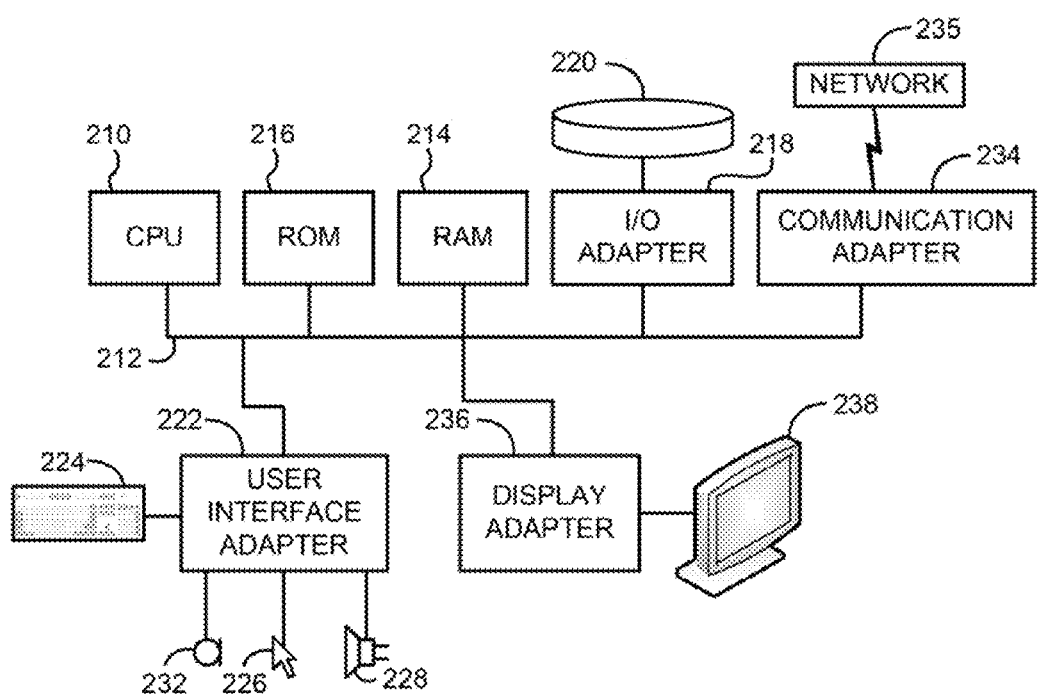
FIG. 2 shows a representative hardware environment that may be associated with the servers and/or clients of FIG. 1, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
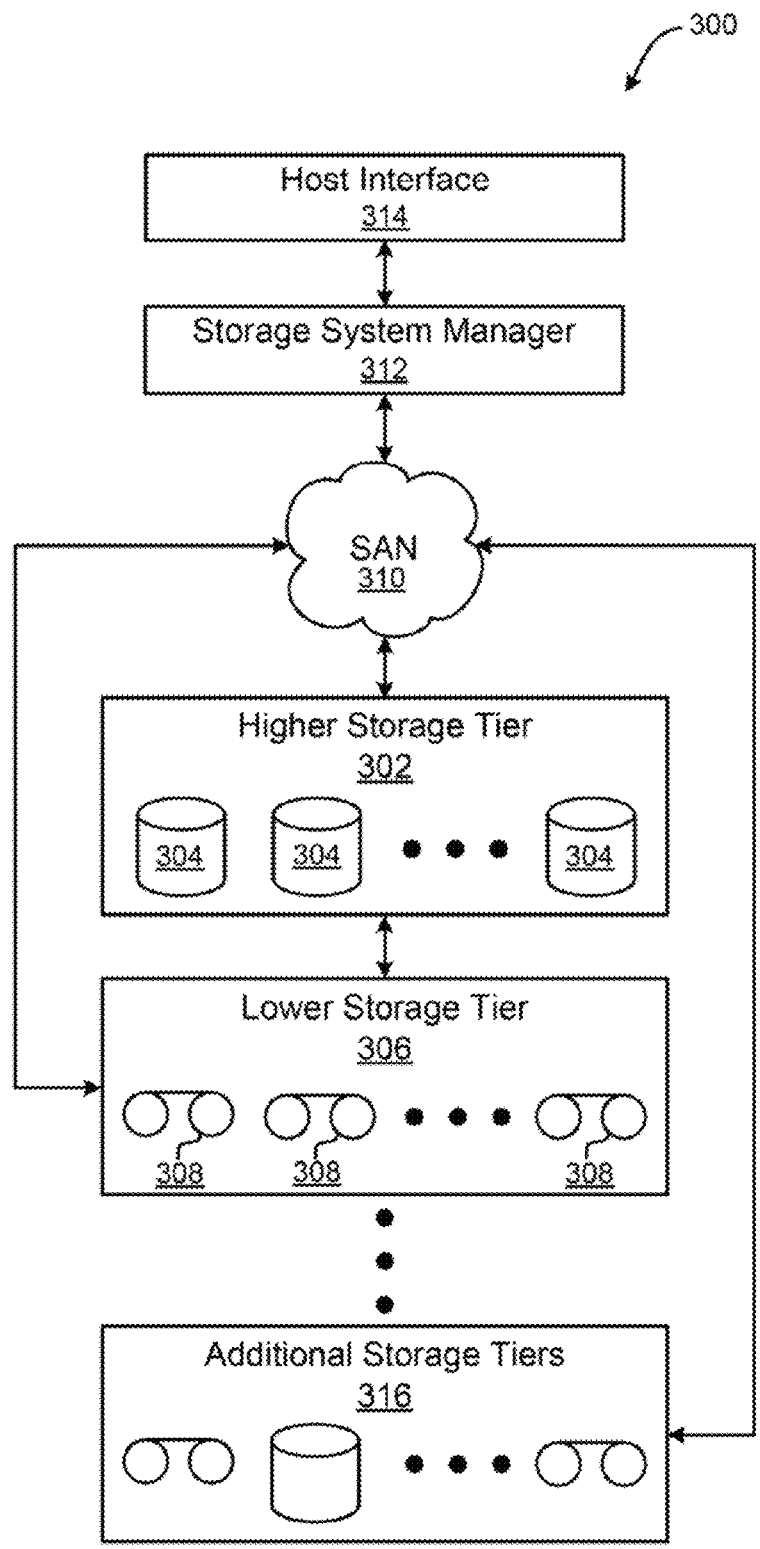
FIG. 3 illustrates a tiered data storage system, according to one embodiment.

Now referring to FIG. 3, a hierarchical storage management (HSM) system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In a preferred embodiment, the higher storage tier 302 may include one or more hard disk drives, and the lower storage tier 306 may include one or more tape drives.

Figure 4A:
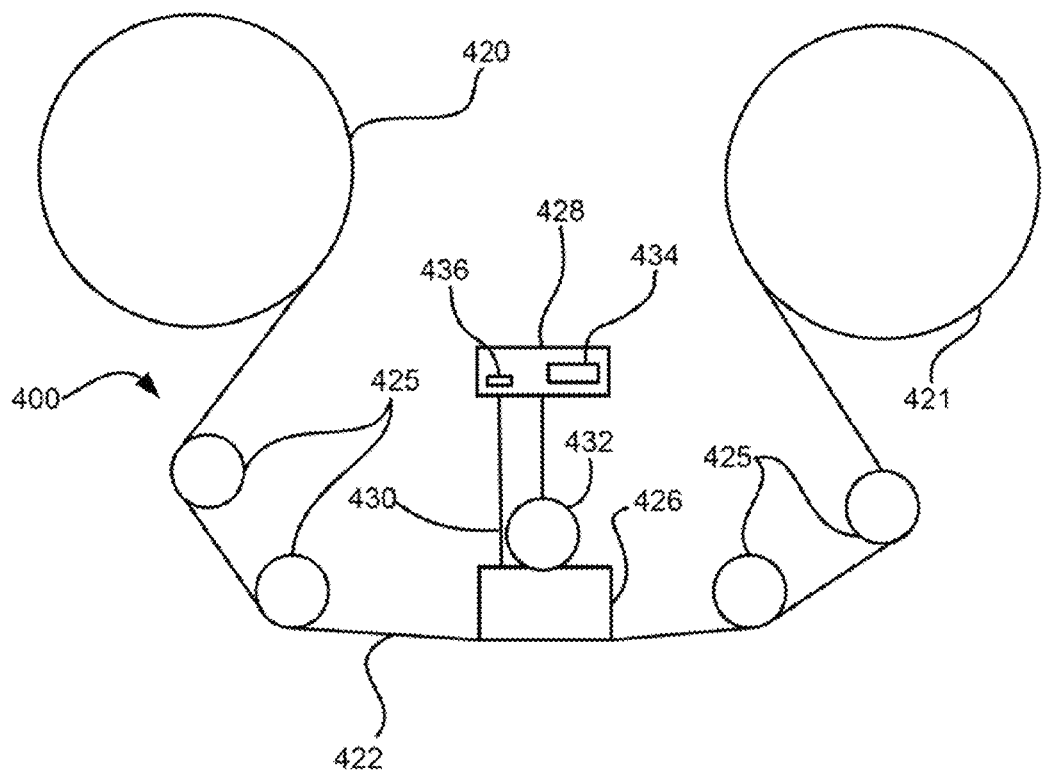
FIG. 4A is a schematic diagram of a simplified tape drive system, according to one embodiment.

FIG. 4A illustrates a simplified tape drive 400, which may be employed in data storage systems such as HSM system 300. While one specific implementation of a tape drive is shown in FIG. 4A, it should be noted that the embodiments described herein may be implemented in the context of any type of tape drive system.

As shown, a tape supply cartridge 420 and a take-up reel 421 are provided to support a tape 422. One or more of the reels may form part of a removable cartridge and are not necessarily part of the system 400. The tape drive, such as that illustrated in FIG. 4A, may further include drive motor(s) to drive the tape supply cartridge 420 and the take-up reel 421 to move the tape 422 over a tape head 426 of any type. Such head may include an array of readers, writers, or both.

Guides 425 guide the tape 422 across the tape head 426. Such tape head 426 is in turn coupled to a controller 428 via a cable 430. The controller 428, may be or include a processor and/or any logic for controlling any subsystem of the drive 400. For example, the controller 428 typically controls head functions such as servo following, data writing, data reading, etc. The controller 428 may operate under logic known in the art, as well as any logic disclosed herein. The controller 428 may be coupled to a memory 436 of any known type, which may store instructions executable by the controller 428. Moreover, the controller 428 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 430 may include read/write circuits to transmit data to the head 426 to be recorded on the tape 422 and to receive data read by the head 426 from the tape 422. An actuator 432 controls position of the head 426 relative to the tape 422.

An interface 434 may also be provided for communication between the tape drive 400 and a host (integral or external) to send and receive the data and for controlling the operation of the tape drive 400 and communicating the status of the tape drive 400 to the host, all as will be understood by those of skill in the art.

Figure 4B:
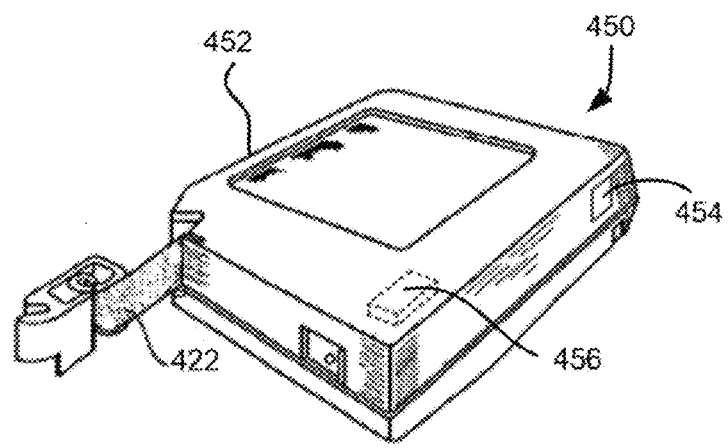
FIG. 4B is a schematic diagram of a tape cartridge, according to one embodiment.

FIG. 4B illustrates an exemplary tape cartridge 450 according to one embodiment. Such tape cartridge 450 may be used with a system such as that shown in FIG. 4A. As shown, the tape cartridge 450 includes a housing 452, a tape 422 in the housing 452, and a nonvolatile memory 456 coupled to the housing 452. In some approaches, the nonvolatile memory 456 may be embedded inside the housing 452, as shown in FIG. 4B. In more approaches, the nonvolatile memory 456 may be attached to the inside or outside of the housing 452 without modification of the housing 452. For example, the nonvolatile memory may be embedded in a self-adhesive label 454. In one preferred embodiment, the nonvolatile memory 456 may be a Flash memory device, ROM device, etc., embedded into or coupled to the inside or outside of the tape cartridge 450. The nonvolatile memory is accessible by the tape drive and the tape operating software (the driver software), and/or other device.

According to various embodiments, data storage systems disclosed herein (such as the HSM system 300) may include logic adapted to receive a request to open a data set, logic adapted to determine if the requested data set is stored to a lower storage tier (e.g. 306 of the tiered data storage system 300) in multiple associated portions, logic adapted to move each associated portion of the requested data set to a higher storage tier (e.g. 302 of the tiered data storage system 300), and logic adapted to assemble the requested data set on the higher storage tier (e.g. 302 of the tiered data storage system 300) from the associated portions. Of course, this logic may be implemented as a method on any device and/or system or as a computer program product, according to various embodiments.

In data storage systems, such as the HSM system 300 shown in FIG. 3, it is often advantageous to reduce the elapsed time associated with a recall operation (e.g. the time to locate and recall a data file on a tape medium). During a typical recall operation, an application running on a host system may request access to a data file that is not available on a higher storage tier. Accordingly, the data file may be retrieved from a lower storage tier and stored on the higher storage tier, from which the application may then access the requested file. However, the data rate for a tape drive to read data from a tape medium is generally much faster than the host data rate (e.g. the data rate between the host and the tape drive) in an HSM system. For example a tape drive on the lower storage tier of an HSM system may be able to read data from a tape medium at a data rate of 250 MB/sec; yet, the total bandwidth of a higher storage tier may not allow the host to read data from the tape drive at or near the data rate of 250 MB/sec.

As an exemplary illustration only, consider a recall operation in an HSM system (e.g. the HSM system 300 shown in FIG. 3), which has a higher storage tier comprising one or more hard disk drives, and a lower storage tier comprising one or more tape drives. Suppose that the total bandwidth of the higher storage tier (e.g. the total bandwidth of the hard disk storage) is 2500 MB/sec, and an application running on a host system uses 2000 MB/sec. Accordingly, the total bandwidth for the recall operation is 2500 MB/sec−2000 MB/sec=500 MB/sec. If there are N number of tape drives in the lower storage tier, then the average data rate for each tape drive is equal to 500 MB/sec/N. For this particular illustration, suppose that there are 10 tape drives; thus, the data rate between the higher storage tier (the hard disk drives) and each tape drive is 500 MB/sec/10=50 MB/sec. Additionally, assume that the data rate between each of the tape drives and the tape medium is 250 MB/sec.

Continuing with the above exemplary illustration, suppose that an application running on a host system requests access to a 500 MB data file that is recorded on a tape medium present in the lower storage tier. A simplified, total recall sequence may be described as follows:
1. A computing resource coupled to and/or embedded in an HSM component (e.g. a host interface and/or a host system manager in communication with an application running on a host system) determines the target tape cartridge and tape drive to recall, where the target tape cartridge comprises the tape medium on which the requested data file is recorded;
2. The target tape cartridge is loaded into the target tape drive;
3. The requested file on the tape medium is located, e.g. the tape medium is positioned to the beginning of the first data record of the data file;
4. The requested file is read/accessed;
5. The mount position of the tape medium is located, e.g. the tape medium is positioned/returned to the mount position,
6. The target tape cartridge is unmounted;
7. Steps 1-6 are repeated if applicable (e.g. where there are more requested data files to be recalled).

Steps 1-7 may be executed sequentially (not in parallel), in preferred approaches. As the data rate between the tape drive and the hard disk storage is 50 MB/sec, reading the 500 MB requested file in step 4 will take 500 MB/50 MB/sec=10 seconds. This is longer than the 2 second time that elapses for a tape drive to read the data file from the tape medium (500 MB/250 MB/sec=2 seconds).

Embodiments disclosed herein provide systems, methods and computer program products to reduce the total elapsed time to recall a plurality of data files from a tape medium during a recall operation. For instance, in preferred embodiments, before a requested data file from a tape medium is located (e.g. before step 4 described above commences), a list including the requested data files (also referred to as the requested user data segments) arranged according to a preferred order of retrieval may be received, e.g. by a tape drive, where the list additionally includes information comprising the beginning and ending of the physical location of each requested data file on the tape media. Upon receipt of such a list, a tape drive may terminate a read ahead operation when the end of a requested data file is reached and immediately locate to the next requested data file specified in the list, in various approaches. In numerous approaches, the ordered list of requested data files and the information comprising the physical location of each of the requested data files on the tape medium may be determined and/or transmitted by an application running on a host system, a computing resources (e.g. a processor, a memory, an application specific integrated circuit (ASIC), a field programmable gate array (FPGA), etc.) coupled to and/or embedded in a component of an HSM system, etc.

An example of how the embodiments disclosed herein facilitate the reduction in the total time it takes to recall one or more data files from a tape medium during a recall operation may be illustrated by again referring to the exemplary illustration of an HSM system and the simplified recall operation discussed above. Suppose, again, that an application running on a host system requests access to a 500 MB data file that is recorded on a tape medium present in the lower storage tier of the exemplary HSM system. In this example, the data rate between the tape medium and tape drive is 250 MB/sec, whereas the data rate between the tape drive and the higher storage tier (hard disk drives) is 50 MB/sec. Thus, the time to retrieve the requested file from the tape medium is 2 seconds (500 MB/250 MB/sec=2 seconds), whereas the time to retrieve the requested file from the tape drive is 10 seconds (500 MB/50 MB/sec=10 seconds). Suppose, as well, that the average time to load the target tape cartridge comprising the tape medium on which the requested data file is recorded is 15 seconds, and the time to locate the requested data file on the tape medium after mounting the target tape cartridge is 40 seconds. Assuming the tape drive has a larger buffer size than the file size of the requested data file (e.g. the tape drive has a 1 GB buffer memory) and the tape drive returns to the mount position of the tape medium after reading/accessing the requested 500 MB data file, the time to locate the mount position (e.g. step 5 of the simplified recall operation reproduced below) may be reduced by 8 seconds (10 seconds [time to retrieve requested file from the tape drive]−2 seconds [time to retrieve the requested file from the tape medium]=8 seconds). Approximate time periods for the simplified, total recall operation may be as follows:

1. Computing resource embedded in and/or coupled to an HSM component determines the target tape cartridge and tape drive to recall=N/A;
2. Load target tape cartridge into target tape drive=15 seconds;
3. Locate the requested file on the tape medium=40 seconds;
4. Read/access the requested file=10 seconds;
5. Locate the mount position of the tape medium=40 seconds−8 seconds=32 seconds;
6. Unmount the tape cartridge=15 seconds.

The total time to perform the recall operation without the 8 second reduction in time during step 5 is 120 seconds. However, the total time to perform the recall operation with the 8 second reduction in time during step 5 is 120 seconds−8 seconds=112 seconds. Thus, the embodiments disclosed herein may achieve a 6%, or up to a 6%, reduction in elapsed time during a recall operation. It is important to note that while the above example illustrates the reduction in elapsed time to recall a 500 MB requested file in accordance with the embodiments disclosed herein, such embodiments also facilitate the reduction in elapsed time to recall a plurality of data files of varying sizes.

Figure 5:
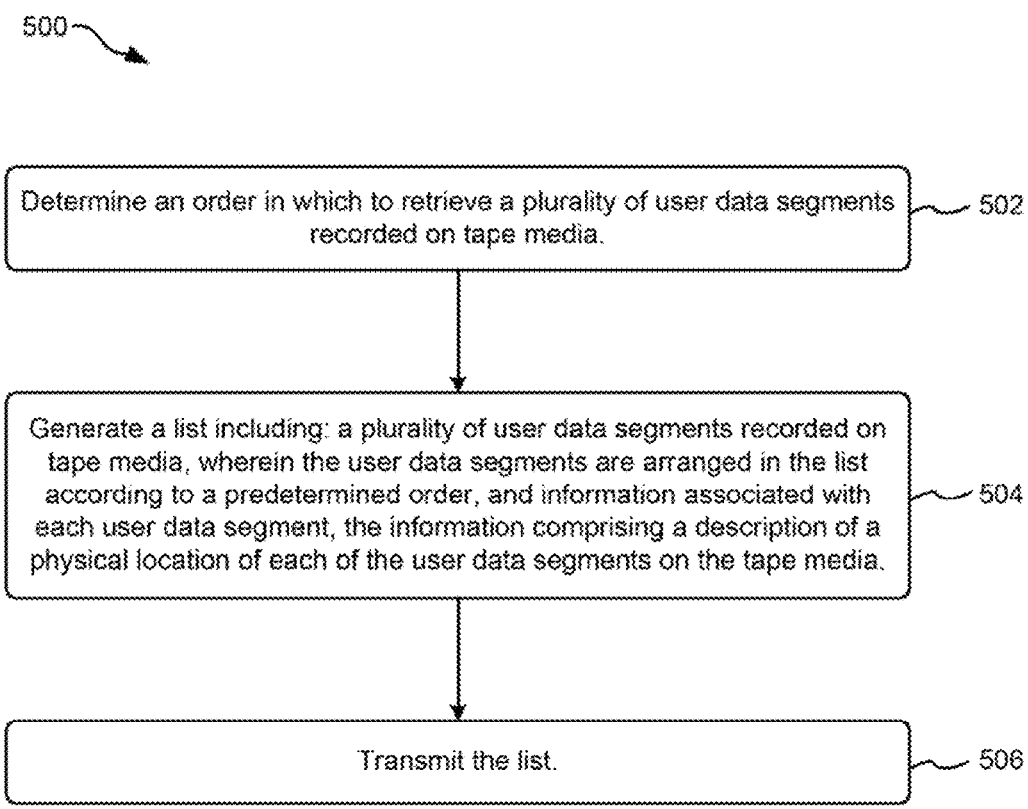
FIG. 5 is a flowchart of a method, according to one embodiment.

Referring now to FIG. 5, a flowchart of a method 500 for generating and transmitting a list comprising a plurality of user data segments to be retrieved from tape media is shown, according to one embodiment. As an option, the present method 500 may be carried out in any desired environment, including those described herein, and may include embodiments and/or approaches described herein. Of course, more or less operations than those shown in FIG. 5 may be included in method 500, as would be understood by one of skill in the art upon reading the present descriptions.

Each of the steps of the method 500 may be performed by any suitable component of the operating environment. For example, in various non-limiting embodiments, the method 500 may be partially or entirely performed by a computing resource including but not limited to a processor, such as a central processing unit (CPU), an application specific integrated circuit (ASIC), a field programmable gate array (FPGA), etc., which may be embedded in and/or operate within a system, an apparatus, etc., and which may have logic embedded with and/or accessible to the processor. In exemplary embodiments, the method 500 may be partially or entirely performed by one or more of the above computing resources, which may be optionally embedded in and/or coupled to a host system.

As shown in FIG. 5, the method 500 includes determining an order in which to retrieve a plurality of user data segments recorded on a tape medium or tape media. See operation 502. As used herein, the order in which the plurality of user data segments are to be retrieved from the tape media may be referred to as the "retrieval order" or the "access order."

In one embodiment, the retrieval/access order may be determined by an application running on a host system. In some approaches, the retrieval/access order determined by the application may be random, based on an algorithm, based on user preferences, based on historical operating conditions, etc. In other approaches, the retrieval/access order determined by the application may be based on positional information associated with the user data segments, e.g. information regarding the physical locations of the user data segments on the tape media. In various approaches, positional information associated with a user data segment and its respective data records may be stored to predetermined physical areas or regions on the tape media; in a computing resource (e.g. a memory, a processor, etc.) embedded in and/or coupled to a host system, a first/higher storage tier of a HSM system comprising random access and/or direct access media, a second/lower storage tier of a HSM system comprising sequential access media, etc.; in a tape directory or mapping table created, maintained and/or stored by one or more processors embedded in and/or coupled to a HSM system, etc.

With continued reference to FIG. 5, the method 500 also includes generating a list comprising the plurality of user data segments to be retrieved from the tape media. See operation 504. In preferred approaches, the plurality of user data segments may be arranged in the list according to the order in which they are to be retrieved (e.g. according to the retrieval/access order).

In one embodiment, the list may include information associated with each of the plurality of user data segments, where such information comprises a description of a physical location of each of the user data segments on the tape media. In some approaches, the description of the physical location of each of the user data segments may include a beginning logical object identifier associated with the beginning (e.g. the first) logical object (e.g. data record) of the user data segment, an ending logical object identifier associated with the ending (e.g. the last) logical object of the user data segment, and a partition number identifying the partition on the tape media in which the user data segment is located.

According to various approaches, the rape media may comprise one or more partitions. Moreover, in approaches where the tape media comprises a plurality of partitions, each of the partitions may be a logically independent unit, e.g. each of the partitions may be separate and distinct. Moreover still, within each partition, logical objects may be recorded thereto. For example, within a partition that has logical objects recorded thereto, the partition may comprise a continuous sequence of logical objects (a user data segment UDS).

With reference again to the information associated with each of the plurality of user data segments, this information may also include a descriptor describing the user data segment (a UDS descriptor); a name or identifier given to the user data segment by an application; a length of data in the user data segment descriptor; a description of the physical wrap in which the user data segment is recorded, etc. in more approaches, In another embodiment, the plurality of user data segments in the list may have physical locations on the tape media that are sequential. Stated another way, the plurality of user data segments may be serially located on the tape media. By way of illustration only, consider an approach where the list includes three user data segments ($UDS_1$, $UDS_2$, and $UDS_3$) which are to be retrieved from the tape media in the following order: $UDS_1$; $UDS_2$; $UDS_3$. The physical locations of $UDS_1$, $UDS_2$, and $UDS_3$ on the tape media may be sequential/serial, such that, relative to a mount position of the tape media, $USD_1$ is located before $UDS_2$, $UDS_2$ is located before $UDS_3$, etc. A simplified representation of these three user data segments having sequential physical locations on the tape media may be exemplified as: Mount Position, $UDS_1$, $UDS_2$, $UDS_3$. It is important to note that in some approaches, one or more user data segments that are not present in the list may be physically located between the mount position and $UDS_1$, and/or between at least two of the user data segments in the list (e.g. between the physical locations of $UDS_1$ and $UDS_2$ and/or $UDS_2$ and $UDS_3$, etc.).

In yet another embodiment, the plurality of user data segments in the list may have physical locations on the tape media that are non-sequential. Stated another way, in such approaches, the plurality of user data segments in the list may not by serially located on the tape media. By way of illustration only, again consider an approach where the list includes three user data segments ($UDS_1$, $UDS_2$, and $UDS_3$) which are to be retrieved from the tape media in the following order: $UDS_1$; $UDS_2$; $UDS_3$. The physical locations of at least two of the three user data segments may not be serial/sequential on the tape media. For example, various representations of these three user data segments having non-sequential physical locations on the tape media may be exemplified as:

Mount Position, $UDS_1$, $UDS_3$, $UDS_2$;
Mount Position, $UDS_2$, $UDS_1$, $UDS_3$;
Mount Position, $UDS_2$, $UDS_3$, $UDS_1$;
Mount Position, $UDS_3$, $UDS_1$, $UDS_2$;
Mount Position, $UDS_3$, $UDS_2$, $UDS_1$.

As detailed above, it is important to note that in some approaches, one or more user data segments that are not present in the list may be physical located between the mount position and a user data segment from the list that is physically located closest to the mount position, and/or between at least two of the user data segments in the list (e.g. between the physical locations of $UDS_1$ and $UDS_2$, and/or $UDS_1$ and $UDS_3$, and/or $UDS_2$ and $UDS_3$, etc.).

Referring again to FIG. 5, the method 500 also includes transmitting the list. See operation 506. In some approaches, the method 500 additionally includes transmitting one or more requests (e.g. SCSI commands) to locate and/or access/read each of the user data segments on the tape media according to the order in the list. Thus, in various approaches, the list may be included in and/or referenced by such requests/commands. In preferred approaches, the list and/or requests/commands comprising the list may be transmitted by an application running on a host system.

Figure 6A:
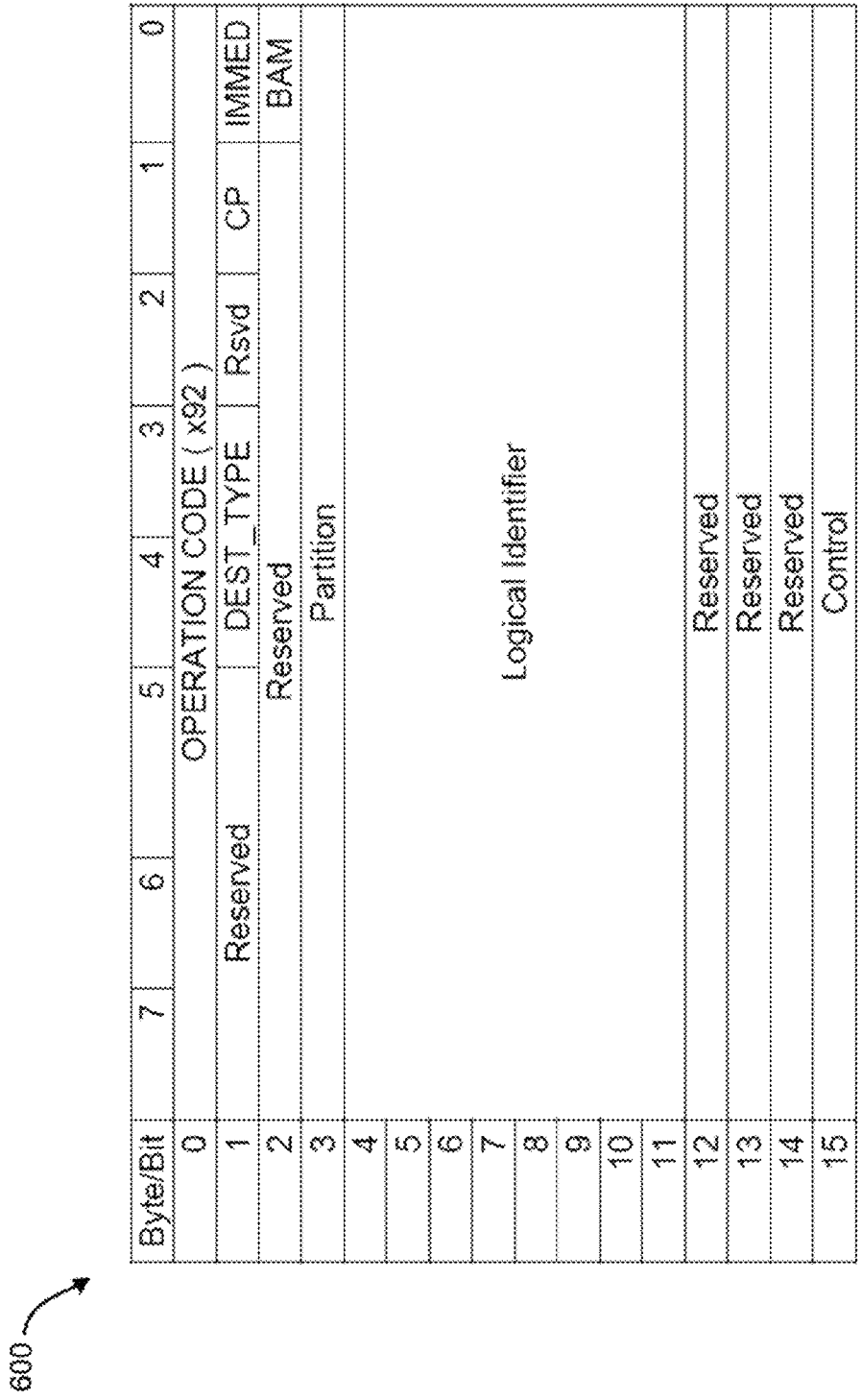
FIG. 6A illustrates a generalized diagram of a typical command to locate one or more user data segments from a tape media.

Illustrative examples of requests/commands to locate, and/or access/read user data segments recorded on tape media are presented in FIGS. 6A-6B. FIG. 6A illustrates a typical command 600 to locate one or more user data segments from the tape media, where such command does not include positional information associated with the requested user data segments (e.g. information describing a logical position at the beginning and end of each user data segment). In contrast, FIG. 6B illustrates an enhanced locate command 601 ("Enhanced Locate Command"), which includes an ordered list of user data segments to be retrieved from the tape media, along with positional information associated with the requested user data segments, according to one embodiment. In particular, the command descriptor block (CDB) of the Enhanced Locate Command 601 may include a description of: the end position of a first requested user data segment on the tape media, the position of the next user data segment to be located/read after the first user data segment, etc. For example, as shown in FIG. 6B, bytes 4-11 correspond to the Logical Identifier associated with a first requested user data segment, bytes 12-19 indicates the Logical Identifier associated with the end of the first user data segment (which implies the logical position at the end of the first user data segment), and bytes 20-28 correspond to the Logical Identifier for a second (e.g. the next) requested user data segment (which implies the logical position for the second/next requested user data segment).

FIG. 7A illustrates another exemplary command 700 (a "Sequence Access Order Command") to locate, and/or access/read user data segments recorded on tape media, according to a further embodiment. As shown in FIG. 7A, the Sequence Access Order Command comprises a Parameter List Length field, which specifies the length in bytes of the Parameter List (also referred to as the Access Order List) that is transferred from the initiator (e.g. an application on a host system) to a target (e.g. a tape drive). The contents of the Parameter List (Access Order List) 701 transmitted with the Sequence Access Order Command 700 are illustrated in FIG. 7B. As shown in FIG. 7B, Parameter List (Access Order List) 701 comprises the following fields: an Additional Data field describing the amount of data to follow, and the User Data Segment Descriptor field including an ordered list of user data segments to be retrieved from the tape media. FIG. 7C provides further detail as to the data to be included in the User Data Segment Descriptors. For instance, as shown in FIG. 7C, a User Data Segment Descriptor 703 associated with a user data segment in the Parameter List (Access Order List) comprises the following fields: a Descriptor Length describing the length of data to follow in the UDS Descriptor; a UDS name describing the name given to the user data segment (e.g. by an application); a Partition Number identifying the partition on the tape media in which in the user data segment is located; a Beginning Logical Object Identifier corresponding to the beginning (e.g. the first) logical object (e.g. data record) of the user data segment; and an Ending Logical Object identifier corresponding to the ending (e.g. the last) logical object of the user data segment. In some approaches, the User Data Segment Descriptor associated with a user data segment in the Parameter List (Access Order List) may also comprise additional information (not shown in FIG. 7C) including but not limited to: a Wrap identifier describing the physical wrap in which the user data segment is recorded; a Band identifier describing the band in which the user data segment is recorded; a Begin Point Geometry identifier describing the geometry of the logical object identified by the Beginning Logical Object Identifier field; an End Point Geometry identifier describing the geometry of the logical object identified by the Ending Logical Object Identifier field; a description of the estimated relative longitudinal position of the logical object identified by the Logical Object Identifier relative to the earliest physical recording start, etc.

In some embodiments, the method 500 of FIG. 5 may also include transmitting the list comprising the plurality of user data segment to be retrieved from the tape media along with a request/command to reorder the list. As used herein, the command to reorder the list may be referred to as a Generate Recommended Access Order (GRAO) Command, and may comprise the identical or substantially the same fields in its CDB as those in the Sequence Access Order Command shown in FIGS. 7A-7C, in some approaches. For instance, the GRAO Command may be identical to the Sequence Access Order Command illustrated in FIG. 7A, except that byte 1 of the GRAO command would specify "Generate Recommend Access Order Command" (along with the appropriate operation code) instead of referring to "Access Order Command (001b)" as shown in FIG. 7A. In various approaches, the GRAO command comprising the plurality of user data segments may be transmitted to a computing resource (e.g. a processor, a memory, etc.) coupled to and/or embedded in a tape drive, a host system, a HSM system, etc. Reordering the list comprising the plurality of user data segments may provide one way in which to minimize the time to access/read the requested user data segments from the tape media. For instance, in numerous approaches, the list may be reordered based on the physical locations of the user data segments on the tape media. In exemplary approaches, the manner or process by which the list is reorder may be specified by the GRAO Command.

Figure 8:
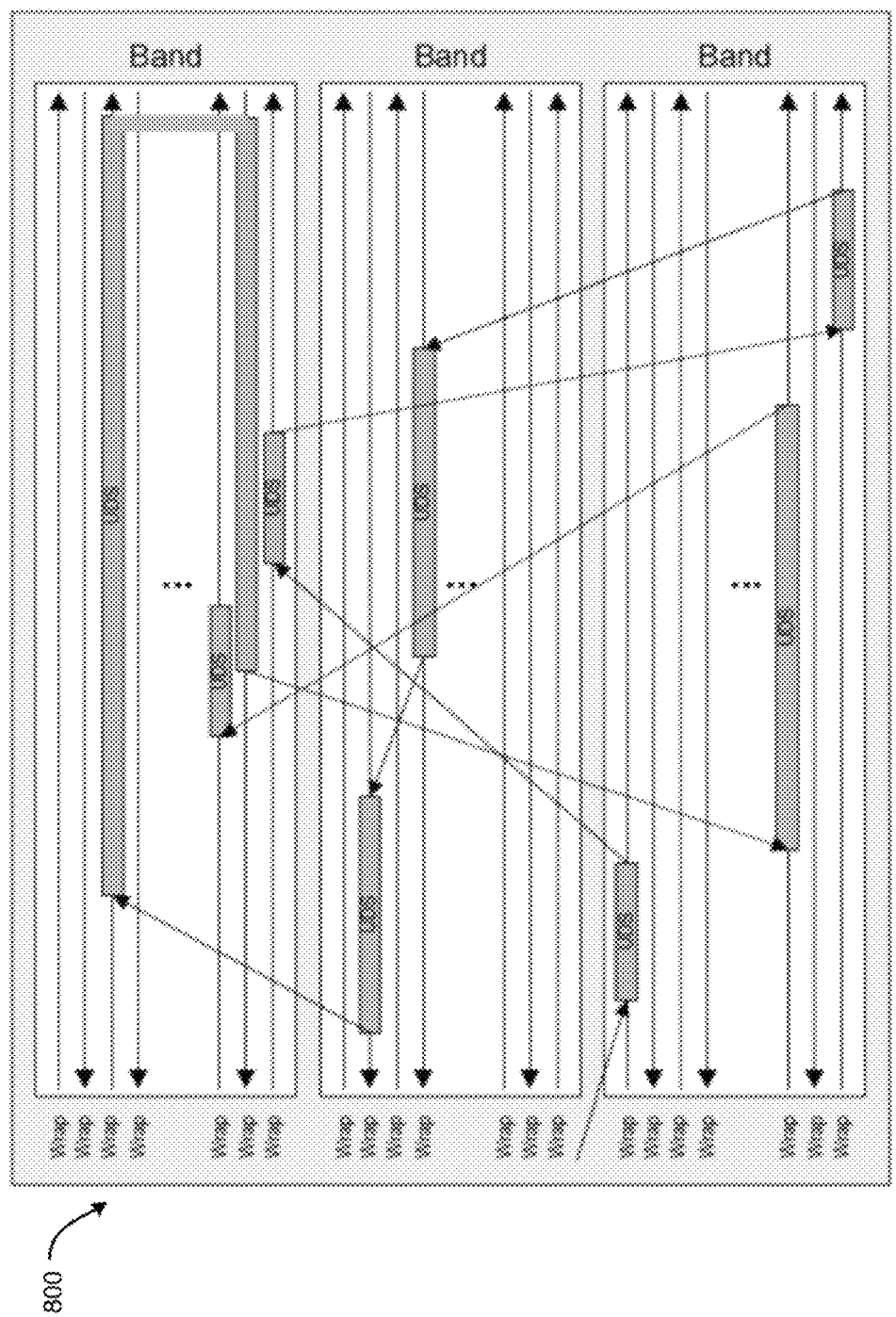
FIG. 8 illustrates a generalized diagram of a recommended access order for a sample layout of user data segments, according to one embodiment.

In approaches where the method 500 of FIG. 5 may include transmitting the GRAO Command, the method 500 may also include receiving the reordered list, herein referred to as the Reordered Access Order (RAO) list. The method 500 may additionally include receiving a command to access/read the reordered list in more approaches. As used herein, the command to receive the GRAO command may be referred to as the Receive Recommended Access Order (RRAO) Command, and may include and/or reference the RAO list. In more approaches, the generated RAO list may comprise the reordered list of user data segments to be retrieved from the tape media with or without geometry descriptors associated with the user data segments. Geometry descriptors associated with the user data segments may be used to build and/or view a representation of the physical layout of the user data segments on the tape media, and may be useful for visual feedback and/or for an application to create its own algorithm for user data segment retrieval based on physical location. An example of a recommended access order for a sample layout 800 of user data segments is shown in FIG. 8, according to one embodiment.

Preferably, an RAO list included in and/or referenced by a RRAO Command may be generated in response to the most recent GRAO command. In other words, the ROA list that is generated may be valid for the state of the currently mounted tape volume (e.g. the logical position, logical objects on the tape media, etc.) at the time the list is generated. However, if the logical position is changed, or if the logical objects are written or erased, this generated RAO may become out of date. Accordingly, in some approaches, the method 500 of FIG. 5 may additionally include monitoring the operating status of the tape drives to ensure that the generated RAO list has not been invalidated by commands since the processing of the GRAO command.

In preferred embodiments, the list, and/or the above mentioned request/commands referencing and/or including the list, may be transmitted to a tape drive. Accordingly, the plurality of the user data segments in the list may be located on the tape media (e.g. based on the positional information associated with the user data segments in the list), read from the tape media and written to a buffer by the tape drive according to the order specified in the list, in various approaches.

In additional embodiments, the method 500 may further include accessing a user data segment from the list that has been retrieved from the tape media without waiting for a subsequent user data segment from the list to be retrieved and/or without waiting for all the user data segments from the list to be retrieved. Reference is made again to the exemplary illustration where the list includes three user data segments ($UDS_1$, $UDS_2$, and $UDS_3$) which are to be retrieved from the tape media in the following order: $UDS_1$; $UDS_2$; $UDS_3$. $UDS_1$ may first be located on the tape media, read and written to a buffer (e.g. by a tape drive). In some approaches, $UDS_1$ may then be available for access/retrieval (e.g. by an application) upon being written to the buffer and before and/or during the locating, reading, and/or writing of $UDS_2$ (and $UDS_3$) to the buffer.

Figure 9:
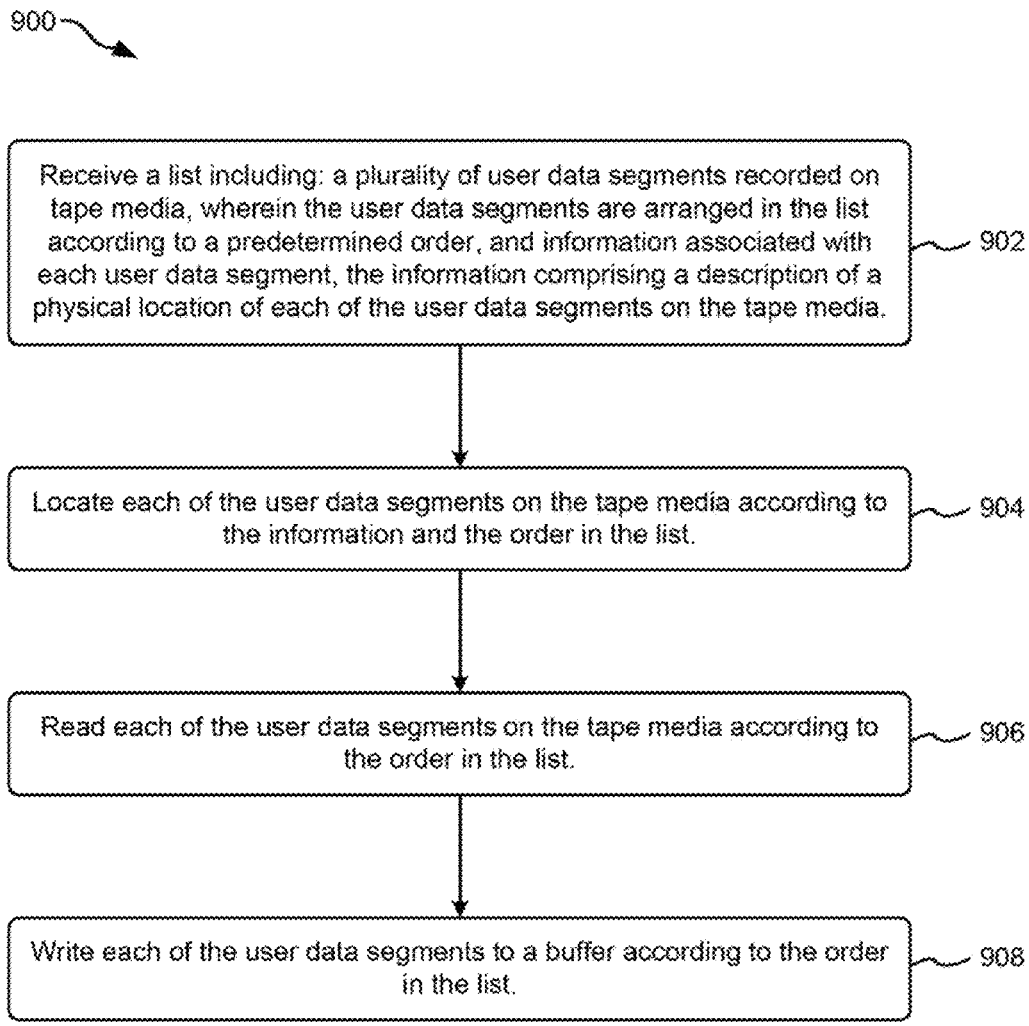
FIG. 9 illustrates a flowchart of a method, according to one embodiment.

Referring now to FIG. 9, a flowchart of a method 900 is shown, according to one embodiment. As an option, the present method 900 may be carried out in any desired environment, including those described herein, and may include embodiments and/or approaches described herein. Of course, more or less operations than those shown in FIG. 9 may be included in method 900, as would be understood by one of skill in the art upon reading the present descriptions.

Each of the steps of the method 900 may be performed by any suitable component of the operating environment. For example, in various non-limiting embodiments, the method 900 may be partially or entirely performed by a computing resource including but not limited to a processor, such as a central processing unit (CPU), an application specific integrated circuit (ASIC), a field programmable gate array (FPGA), etc., which may be embedded in and/or operate within a system, an apparatus, etc., and which may have logic embedded with and/or accessible to the processor. In exemplary embodiments, the method 900 may be partially or entirely performed by one or more of the above computing resources, which may be optionally embedded in and/or coupled to a tape drive.

As shown in FIG. 9, the method 900 includes receiving a list comprising a plurality of user data segments recorded on tape media. See operation 902. In preferred approaches, the plurality of user data segments may be arranged in the list according to a predetermined order. In some approaches, the predetermined order may correspond to the order in which the plurality of user data segments are to be retrieved from a tape media by, for example, a tape drive. For instance, the predetermined order may correspond to the order in which the plurality of user data segments specified in the list are to be located and/or read/accessed on the tape media, and/or written to a buffer. In various approaches, the predetermined order may be determined by an application running on a host system. In further approaches, the predetermined order may be determined by an application running on a host system based on the physical locations of each of the user data segments on the tape media, based on user preferences, based on an algorithm, etc.

According to one embodiment, the received list comprising the plurality of user data segments arranged according to the predetermined order may also include information associated with each of the plurality of user data segments. Such information may comprise a description of a physical location of each of the user data segments on the tape media. In some approaches, the description of the physical location of each of the user data segments may include a beginning logical object identifier corresponding to the beginning (e.g. the first) logical object (e.g. data record) of the user data segment, an ending logical object identifier corresponding to the ending (e.g. the last) logical object of the user data segment, and a partition number identifying the partition on the tape media in which the user data segment is located. In more approaches, the information associated with each of the user data segments in the received list may also include a descriptor describing the user data segment (a UDS descriptor); a name or identifier given to the user data segment by an application; a length of data in the user data segment descriptor; a description of the physical wrap in which the user data segment is recorded, etc.

In some approaches, the method 900 additionally includes receiving one or more requests/commands to locate and/or to access/read, on the tape media, each of the user data segments in the list according to the order in the list. Thus, in various approaches, the list may be included in and/or referenced by these requests/commands. Exemplary commands to locate and/or access user data segments specified in a list are illustrated in FIGS. 6B and 7A-7C.

In more approaches, the method 900 may include mounting the tape media upon which the plurality of user data segments in the list are recorded.

As also shown in FIG. 9, each of the user data segments specified in the list are located on the tape media according to the order in the list. See operation 904. In operations 906 and 908, each of the user data segments specified in the list are read from the tape media and written to a buffer according to the predetermined order in the list, respectively. It is important to note that the locate/position, read and write steps may be repeated for the user data segments in the list according to the predetermined order regardless of whether the physical locations of the user data segments on the tape media are sequential or non-sequential relative to a mount position of the tape media.

Moreover, it is important to note that receipt of a list comprising the plurality of user data segments arranged accorded to a predetermined order, as well as information comprising the physical location associated with each of these user data segments, may help to reduce the time it takes to locate and access/read the requested user data segments from the tape media (e.g. the time required to locate and access/read the requested user data segments after mounting the respective tape media having said user data segments thereon). For example, in approaches where such a list, along with a request to locate and/or read the user data segments in the list, may be received by a tape drive, the tape drive will be appraised of both the order in which to locate and/or read the requested user data segments, as well as the physical locations (e.g. the beginning and end of the physical locations of each user data segment) of each of these requested user data segments on the tape media. Accordingly, the tape drive may position the tape media at the beginning of the physical location of the first user data segment specified in the list, read the first user data segment and write the user data segment to a buffer. Subsequently, the tape drive, rather than performing a traditional read-ahead, may instead immediately position the tape media to the beginning of the physical location of the second user data segment specified the list, read the second user data segment and write the second user data segment to the buffer. The tape drive may then repeat the locate and/or access/read steps for each of the user data segments in the list according to the order in the list until all the requested user data segments have been located and/or read, and/or until the buffer is full.

In some embodiments, the method 900 may also include receiving a request/command (e.g. a GRAO command as discussed previously) to reorder the received list (e.g. the original list described in operation 902) comprising the plurality of user data segments. In some approaches, this request/command to reorder the list may be transmitted to a computing resource (e.g. a processor, a memory, etc.) coupled to and/or embedded in a tape drive. In numerous approaches, the method may reorder the list based on the physical locations of the user data segments on the tape media. In additional approaches, the method may include estimating the time to locate the plurality of user data segments on the tape media from the position of the tape media at the time the GRAO command is processed (such that all the locate times are calculated from the same starting position). In yet other approaches, the time to located the first user data segment in the list may be estimated from the current position of the tape media (e.g. at the time the GRA command is processed) to the beginning logical object identifier of this first user data segment; the time to locate the second user data segment in the list may be estimated from the ending logical object identifier of the first user data segment to the beginning object identifier of this second user data segment, and so on. In further approaches, the reordered list (e.g. a RAO list) may thus include an Estimated Locate Time field describing the estimated time to locate the plurality of user data segments on the tape media from the position of the tape media at the time the GRAO command is processed.

In more embodiments, the method 900 may include transmitting the reordered list (e.g. a RAO list). In some approaches, the reordered list may be transmitted back to a computing resource embedded in and/or coupled to an HSM system that sent the original list comprising the plurality of user data segments. In various approaches, the reordered list may be transmitted to an application running on a host system. Illustrative examples of systems, methods and computer program products for reordering user data segment lists to reduce seek times when accessing data stored on tape media are disclosed in U.S. patent application Ser. No. 12/862,198, which is herein incorporated by reference in its entirety.

In still more embodiments, the method 900 may include returning to the mount position of the tape media after all the requested user data segments recorded thereon have been located and/or read and/or written to the buffer. Further, the method 900 may also include unmounting the tape cartridge comprising the tape media having the requested user data segments thereon.

Figure 10:
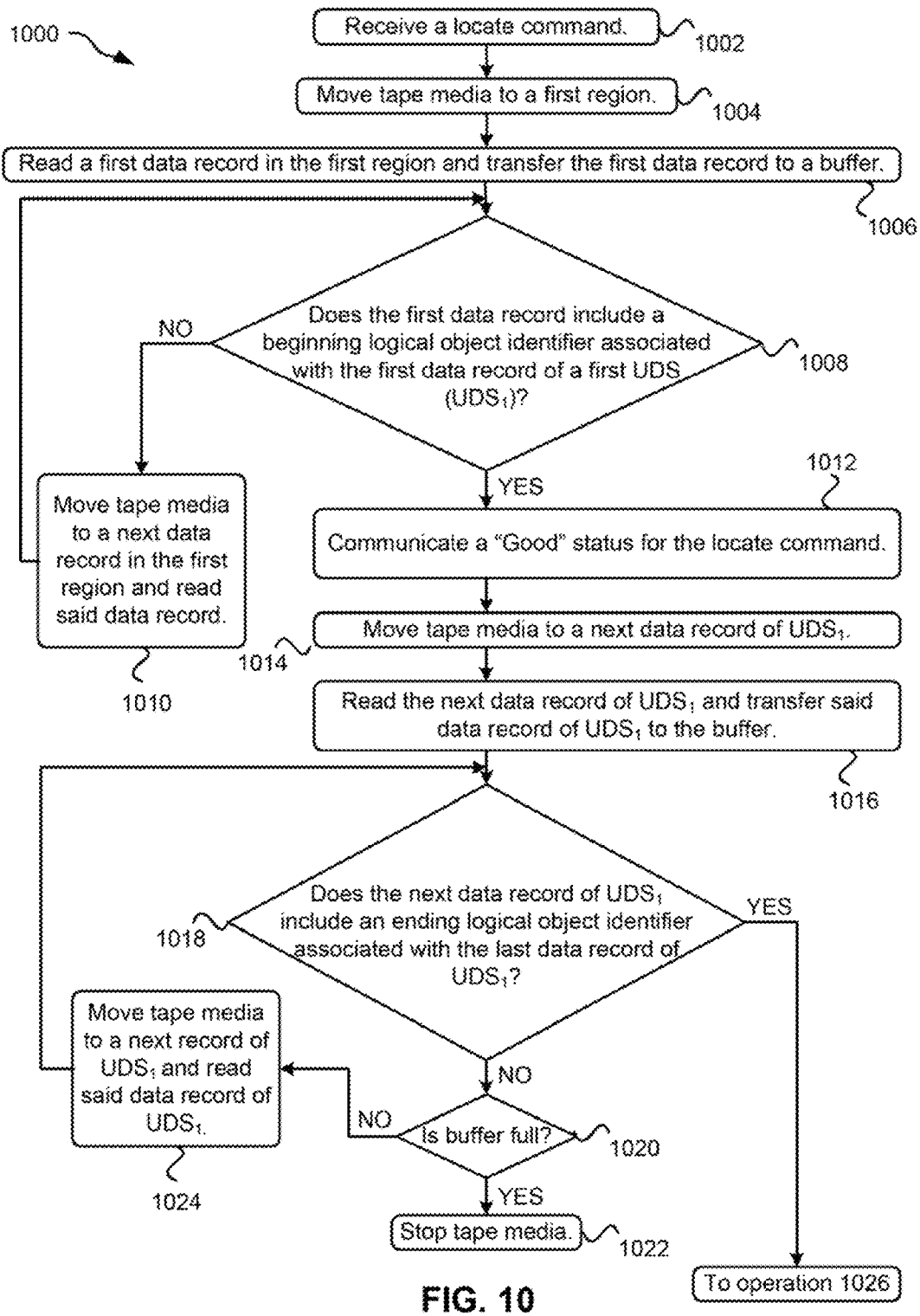
FIG. 10 illustrates a flowchart of a method, according to one embodiment.
Figure 10:
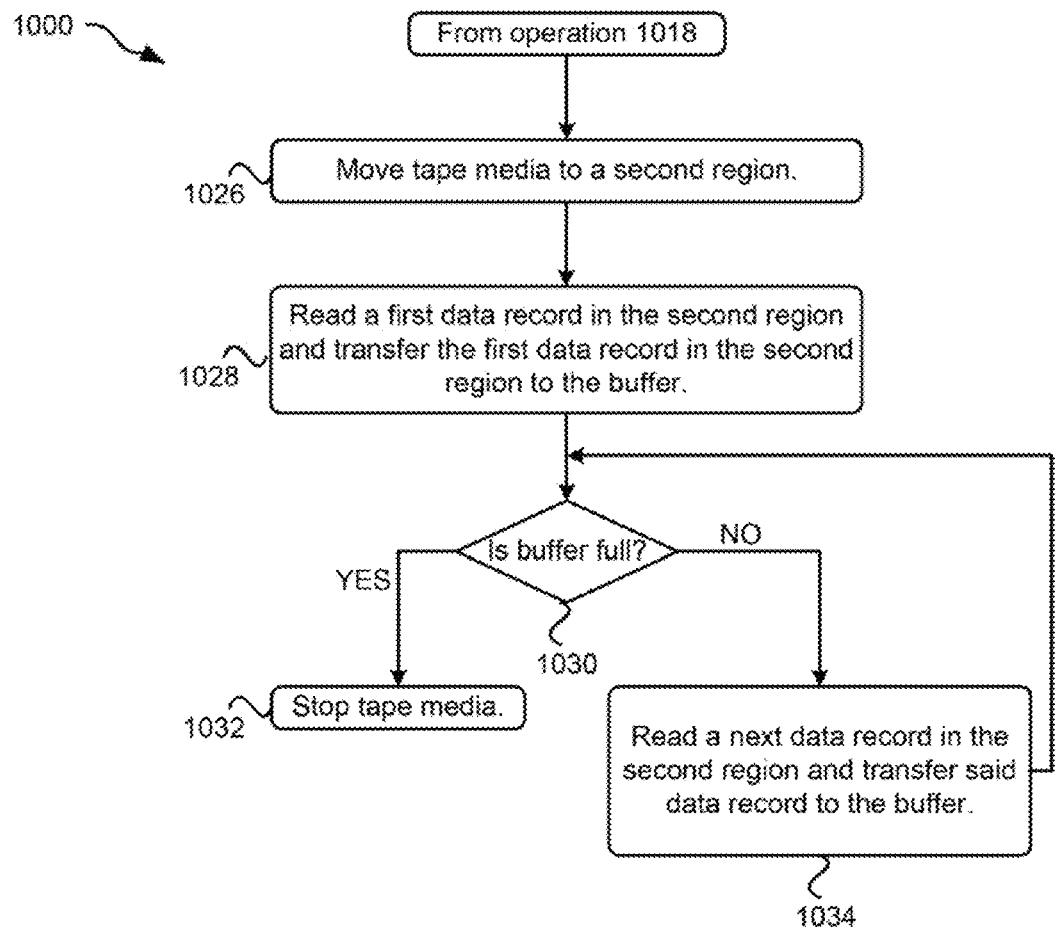

Referring now to FIG. 10, a flowchart of a method 1000 for locating and accessing/reading a plurality of user data segments on tape media is shown, according to one embodiment. As an option, the present method 1000 may include embodiments and/or approaches described herein. Of course, more or less operations than those shown in FIG. 10 may be included in method 1000, as would be understood by one of skill in the art upon reading the present descriptions.

Each of the steps of the method 1000 may be performed by any suitable component of the operating environment. For example, in various non-limiting embodiments, the method 1000 may be partially or entirely performed by a computing resource including but not limited to a processor, such as a central processing unit (CPU), an application specific integrated circuit (ASIC), a field programmable gate array (FPGA), etc., which may be embedded in and/or operate within a system, an apparatus, etc., and which may have logic embedded with and/or accessible to the processor. For the sake of clarity and discussion, the method 1000 described below may be assumed to be partially or entirely performed by one or more computing resources embedded in and/or coupled to a tape drive. In some approaches, the tape drive may be a component in an HSM system.

As shown in FIG. 10, the method 1000 may initiate with operation 1002, where a tape receives a locate command to locate and access/read a plurality of requested user data segments recorded on tape media. The plurality of user data segments identified in the command may be arranged in a list according to a predetermined order, where the predetermined order corresponds to the order in which the user data segments are to be located and read/accessed on the tape media, in various approaches. In preferred approaches, the command may also include information associated with each user data segment to be located and read/accessed, where the information comprises a description of a physical location of each of the user data segments on the tape media. For instance, the description of the physical location of each of the user data segments may include at least a beginning logical object identifier describing the beginning (e.g. the first) logical object (e.g. data record) of the user data segment, and an ending logical object identifier describing the ending (e.g. the last) logical object of the user data segment.

In operation 1004, the tape drive moves the tape media to a first region, wherein the first region is expected to comprise the first requested user data segment ($UDS_1$) based on the information provided in the command. In operation 1006, a first data record in this first region is read from the tape media and transferred/written to a buffer.

In operation 1008, a determination is made as to whether this first data record in the first region includes a beginning logical object identifier associated with the beginning data record of $UDS_1$. If not, the method 1000 continues to operation 1010; otherwise the method 1000 continues to operation 1012. Operations 1010 and 1012 may serve to verify that the information specified in the command regarding the physical location of $UDS_1$ on the tape media is accurate, and to ensure that the tape media is properly positioned at the beginning of the physical location of $UDS_1$.

In some approaches, where the received locate command is an Enhanced Locate Command, e.g. as shown in FIG. 6B, operation 1008 may involve determining whether the first data record in the first region includes the Logical Identifier associated with the beginning data record of $UDS_1$ as described in bytes 3-11 of the Enhanced Locate Command. In other approaches, where the received locate command is a GRAO command or a Sequence Access Order Command, e.g. as shown in FIGS. 7A-7C, operation 1008 may involve determining whether the first data record in the first region includes the Beginning Logical Object Identifier associated with the beginning data record of $UDS_1$ as described in bytes 16-23 of the Sequence Access Order Command.

In operation 1010, upon determining that the first data record in this first region does not include the beginning logical object identifier, the tape media is positioned to a second data record in the first region. This second data record may be physically located subsequent to the first data record relative to the mount position of the tape media, in numerous approaches. The second data record may then be read/accessed and written to the buffer by the tape drive.

In operation 1012, if it is determined that the first data record in the first region does include the beginning logical object identifier corresponding to the beginning data record of $UDS_1$, the tape drive communicates a "Good" status for the locate command. The "Good" status indicates that the information in the command regarding at least the description of the beginning of the physical location of $UDS_1$ is accurate, and that the tape media is properly positioned at the first/beginning data record of $UDS_1$. In some approaches, the status for the locate command may be communicated to a computing device that transmitted the locate command to the tape drive. In numerous approaches, the locate command may be communicated to an application running on a host.

After it has been determined that the first/beginning data record of $UDS_1$ has been located and/or read, the tape media is positioned to read/access a next data record of $UDS_1$ in operation 1014. This next data record of $UDS_1$ is physically located subsequent to (after) the first/beginning data record of $UDS_1$ relative to the mount position of the tape media. In operation 1016, this next data record of $UDS_1$ is read/accessed by the tape drive and written to the buffer.

In operation 1018, a determination is made as to whether this next data record of $UDS_1$ (the data record of $UDS_1$ read in operation 1016) includes an ending logical object identifier associated with the ending (e.g. the last) data record of $UDS_1$. If not, the method 1000 proceeds to operation 1020; otherwise the method 1000 proceeds to operation 1026.

In some approaches, where the received locate command is an Enhanced Locate Command, e.g. as shown in FIG. 6B, operation 1018 may involve determining whether this second data record of $UDS_1$ includes the Logical Identifier at the end of User Operations associated with the ending data record of $UDS_1$ as described in bytes 3 and 12-19 of the Enhanced Locate Command. Note that byte 3 is included in this determination, as the partition number for the first and second data records of $UDS_1$ are the same.

In other approaches, where the received locate command is a Sequence Access Order Command, e.g. as shown in FIGS. 7A-7C, operation 1008 may involve determining whether this second data record of $UDS_1$ includes the Ending Logical Object Identifier associated with the ending/last data record of $UDS_1$ as described in bytes 24-31 of the Sequence Access Order Command.

In operation 1020, a determination is made as to whether the buffer is full. If so, the method 1000 continues to operation 1022 where the motion of the tape media is stopped. However, if the buffer is determined not to be full, the method 1000 continues to operation 1024.

In operation 1024, the tape media is positioned to a next data record of $UDS_1$. This next data record of $UDS_1$ is physically located, relative to the mount position of the tape media, subsequent to (after) the physical location of the data record of $UDS_1$ that was most recently read by the tape drive. This next data record of $UDS_1$ may then be read/accessed and written to the buffer by the tape drive.

By way of illustration only, consider an example where a tape drive receives a command to locate two requested user data segments ($UDS_1$ and $UDS_2$) in the following order: $UDS_1$, $UDS_2$. This received locate command also includes a description of the physical locations of $UDS_1$ and $UDS_2$ on the tape media, where such descriptions at least include a beginning logical object identifier associated with the beginning (e.g. the first) data record of each user data segment, and an ending logical object identifier associated with the ending (e.g. the last) data record of each user data segment. For the sake of this illustration, also assume, that $UDS_1$ is associated with 4 data records ($DR_A$, $DR_B$, $DR_C$ and $DR_D$), whose physical locations on the tape media, relative to a mount position, are as follows: mount position . . . $DR_A$, $DR_B$, $DR_C$, $DR_D$. Moreover, for $UDS_1$, the beginning logical object identifier corresponds to $DR_A$, as $DR_A$ is the beginning data record of $UDS_1$; likewise, the ending logical object identifier corresponds to $DR_D$, as $DR_D$ is the ending data record of $UDS_1$.

Continuing with the above exemplary illustration, after receiving the locate command, the tape media may be moved to a first region expected to include $UDS_1$, and a first data record in this first region may be read and transferred to a buffer. Suppose it is determined that this first data record includes the beginning logical object identifier associated with $DR_A$. Accordingly, a good status may be communicated, thereby indicating that this first data record read from the tape media in the first region corresponds to the first data record of $UDS_1$ (e.g. $DR_A$). The tape media may then be moved to the next data record in $UDS_1$, i.e. $DR_B$, and $DR_B$ may be transferred to the buffer. As $DR_B$ does not include the ending logical object identifier (which is associated with $DR_D$), and assuming the buffer is not full, the tape media may then be moved to the next data record in $UDS_1$, i.e. $DR_C$, and $DR_C$ may also be transferred to the buffer. As $DR_C$ also does not include the ending logical object identifier (which is associated with $DR_D$), and again assuming the buffer is not full, the tape media may then be moved to the next data record in $UDS_1$, i.e. $DR_D$, and $DR_D$ may also be transferred to the buffer. However, as $DR_D$ includes the ending logical object identifier, the tape media may then be moved to a second region expected to include $UDS_2$, where the process of identifying and reading the data records of $UDS_2$ continues as for $UDS_1$ (see e.g. operations 1026-1034). It is important to note that this exemplary illustration is in no way limiting, and merely serves as a simplified example only. For instance, a locate command, such as that described in operation 1002, is not limited to referencing only two user data segments, a user data segment is not limited to four data records, etc.

With reference again to FIG. 10, in operation 1026, the tape media is positioned to a second region, wherein the second region is expected to comprise the second requested user data segment ($UDS_2$) based on the information provided in the command. In some approaches, where the received locate command is an Enhanced Locate Command, e.g. as shown in FIG. 6B, the tape media may be positioned based on the expected location of $UDS_2$ as described in bytes 20-28 of the Enhanced Locate Command, which comprise the fields: Partition for Next User Operations (e.g. $UDS_2$) and Logical Identifier for Next user Operations (e.g. $UDS_2$). In other approaches, where the received locate command is a GRAO command or a Sequence Access Order Command, e.g. as shown in FIGS. 7A-7C, the tape media may be positioned based on the information provided in bytes 16-23 of the Sequence Access Order Command, which correspond to the User Data Segment Descriptor of $UDS_2$.

In operation 1028, a first data record from the second region is then read from the tape media and transferred/written to a buffer.

In operation 1030, a determination is made as to whether the buffer is full. If so, the method proceeds to operation 1032 where the tape media is stopped. However, if the buffer is not full, the method 1000 proceeds to operation 1034 where the tape media is positioned to a next data record in the second region, and said data record is read/accessed and written to the buffer. This next data record in the second region is physically located subsequent to (after) the first data record in the second region relative to the mount position of the tape media.

While not shown, the method 1000 may further include determining whether any of the data records accessed in the second region include a beginning or an ending logical object identifier associated with the beginning data record and the ending/last data record of $UDS_2$, respectively. Such an optional determination may be made in order to verify that the information specified in the command regarding the physical location of $UDS_2$ on the tape media is accurate, and to ensure that the tape media is properly positioned at the beginning of the physical location of $UDS_2$ following the read of the $UDS_1$. In various approaches, the method 1000 may continue reading/accessing all the data records of $UDS_2$ until the all such records are read/accessed or until the buffer is full.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising: receiving a list including: a plurality of user data segments recorded on tape media, wherein the user data segments are arranged in the list according to a predetermined order, and information associated with each user data segment, wherein, the information comprises, for each user data segment in the list: a beginning logical object identifier describing a beginning of the user data segment on the tape media; an ending logical object identifier describing an end of the user data segment on the tape media; and a partition number describing a partition on the tape media in which the user data segment is located;
    locating each of the user data segments on the tape media according to the information and the order in the list;
    reading each of the user data segments from the tape media according to the order in the list; and writing each of the user data segments to a buffer according to the order in the list.

2. The method as recited in claim 1, wherein the information comprises:
    a descriptor describing each user data segment; and
    a length of data in each user data segment descriptor.

3. The method as recited in claim 1, wherein the information associated with the plurality of user data segments further comprises: geometry descriptors describing a physical layout of the plurality of user data segments on the tape.

4. The method as recited in claim 1, wherein the user data segments in the list have physical locations on the tape media that are non-sequential.

5. The method as recited in claim 1, wherein each user data segment written to the buffer is available for access upon being written to the buffer and without having to wait for subsequent user data segments in the list and/or all user data segments in the list to be written to the buffer.

6. The method as recited in claim 1, wherein each of the user data segments comprises one or more data records.

7. The method as recited in claim 1, further comprising returning to a mount position of the tape media after all the user data segments in the list are written to the buffer.

8. A method, comprising: determining an order in which to retrieve a plurality of user data segments recorded on tape media; generating a list including: the plurality of user data segments, wherein the plurality of user data segments are arranged in the list according to the order, and information associated with the plurality of user data segments, wherein, the information comprises, for each user data segment in the list: a beginning logical object identifier describing a beginning of the user data segment on the tape media, an ending logical object identifier describing an end of the user data segment on the tape media, and a partition number describing a partition on the tape media in which the user data segment is located; and transmitting the list.

9. The method as recited in claim 8, wherein the information associated with the plurality of user data segments further comprises:
- a descriptor describing each user data segment;
- a length of data in each user data segment descriptor; and
- at least one of a wrap identifier describing the physical wrap in which each user segment is recorded, and a band identifier describing the band in which each user segment is recorded.

10. The method as recited in claim 8, wherein information associated with the plurality of user data segments further comprises: geometry descriptors describing a physical layout of the plurality of user data segments on the tape.

11. The method as recited in claim 8, wherein at least two user data segments in the list have physical locations on the tape media that are non-sequential such that at least one of the user data segments to be retrieved prior to a subsequent user data segment has a physical location on the tape located after the subsequent user data segment relative to a mount position of the tape.

12. The method as recited in claim 8, further comprising transmitting a request to locate and/or retrieve each of the user data segments from the tape media according to the information and the order in the list.

13. The method as recited in claim 12, further comprising accessing a user data segment from the list that has been retrieved without waiting for a subsequent user data segment from the list to be retrieved from the tape media.

14. The method as recited in claim 8, wherein the list is generated and transmitted by a host system.

15. The method as recited in claim 8, wherein the list is transmitted to a tape drive, wherein the plurality of user data segments are located on the tape media, read from the tape media, and written to a buffer by the tape drive according to the information and order in the list.

16. A tape drive comprising a drive buffer, a processor, and logic integrated with and/or executable by the processor, the logic being configured to cause the processor to: receive a list including: a plurality of user data segments recorded on tape media, wherein the user data segments are arranged in the list according to a predetermined order, and information associated with each user data segment, wherein, the information comprises, for each user data segment in the list: a beginning logical object identifier describing a beginning of the user data segment on the tape media; an ending logical object identifier describing an end of the user data segment on the tape media; and a partition number describing a partition on the tape media in which the user data segment is located; locate each of the user data segments on the tape media according to the order in the list; read each of the user data segments from the tape media according to the order in the list; and write each of the user data segments to a buffer according to the order in the list, wherein the list is not reordered prior to locating the user data segments on the tape, reading the user data segments on the tape and writing the user data segments to the buffer.

17. The tape drive as recited in claim 16, wherein the information comprises:
- a descriptor describing each user data segment; and
- a length of data in each user data segment descriptor.

18. The tape drive as recited in claim 16, wherein the information associated with the plurality of user data segments further comprises: geometry descriptors describing a physical layout of the plurality of user data segments on the tape.

19. The tape drive as recited in claim 16, wherein at least two of the user data segments in the list have physical locations on the tape media that are non-sequential such that at least one of user data segments to be located and read prior to a subsequent user data segment has a physical location on the tape located after the subsequent user data segment relative to a mount position of the tape.

20. The tape drive as recited in claim 16, wherein the tape drive is a component of a hierarchical storage management (HSM) system.

\* \* \* \* \*